United States Patent
Xu et al.

(10) Patent No.: US 11,196,337 B1
(45) Date of Patent: Dec. 7, 2021

(54) RECONFIGURABLE REGULATOR FOR REGULATING POWER IN LINEAR AND SWITCHING MODES

(71) Applicant: Marvell International Ltd., Hamilton (BM)

(72) Inventors: Weiwei Xu, Cupertino, CA (US); Xiaoyue Wang, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/662,962

(22) Filed: Oct. 24, 2019

Related U.S. Application Data

(60) Provisional application No. 62/750,137, filed on Oct. 24, 2018.

(51) Int. Cl.
| | |
|---|---|
| *H02M 3/158* | (2006.01) |
| *H02M 1/08* | (2006.01) |
| *H02M 3/157* | (2006.01) |
| *H02M 1/00* | (2006.01) |

(52) U.S. Cl.
CPC ............ *H02M 1/08* (2013.01); *H02M 3/157* (2013.01); *H02M 3/158* (2013.01); *H02M 1/0045* (2021.05)

(58) Field of Classification Search
CPC .... H02M 1/0012; H02M 1/0045; H02M 1/08; H02M 1/088; H02M 3/156; H02M 3/157; H02M 3/158
See application file for complete search history.

(56) References Cited

U.S. PATENT DOCUMENTS

| | | | |
|---|---|---|---|
| 9,590,506 B2 | 3/2017 | Rince et al. | |
| 10,044,263 B2* | 8/2018 | Kumar | H02M 3/156 |
| 2009/0167267 A1* | 7/2009 | Dwarakanath | H02M 1/36 |
| | | | 323/282 |
| 2012/0223686 A1 | 9/2012 | Lin et al. | |
| 2013/0285626 A1* | 10/2013 | Chen | H02M 1/36 |
| | | | 323/271 |
| 2014/0253090 A1 | 9/2014 | Sangam et al. | |
| 2016/0202714 A1* | 7/2016 | Luria | H02M 1/088 |
| | | | 713/300 |

OTHER PUBLICATIONS

"A 1A LDO Regulator Driven by a 0.0013mm2 Class-D Controller", ISSCC, 2017, pp. 30-31, 2017.

* cited by examiner

Primary Examiner — Matthew V Nguyen

(57) ABSTRACT

A reconfigurable regulator includes an error amplifier configured to generate a difference signal indicative of a voltage difference between a reference analog signal and a feedback analog signal; a pulse width modulation generator configured to receive the difference signal, and to generate a first pulse width modulated signal in a linear mode and a second pulse width modulated signal in a switching mode; and a digital multiplexer (MUX) configured to receive a mode selection signal, the first pulse width modulated signal and the second pulse width modulated signal. The digital MUX outputs one of the first pulse width modulated signal or the second pulse width modulated signal based on the mode selection signal. The reconfigurable regulator further includes a digital driver configured to receive one of the first pulse width modulated signal or the second pulse width modulated signal and to output a digital control signal based on the received one of the first pulse width modulated signal or the second pulse width modulated signal.

20 Claims, 3 Drawing Sheets

RECONFIGURABLE REGULATOR FOR REGULATING POWER IN LINEAR AND SWITCHING MODES

CROSS-REFERENCE TO RELATED APPLICATION

This disclosure claims the benefit under 35 U.S.C. § 119(e) of U.S. Provisional Patent Application No. 62/750,137, filed Oct. 24, 2018, which is hereby incorporated by reference herein in its entirety.

FIELD OF USE

This disclosure relates to a reconfigurable regulator, and specifically, to an area-efficient reconfigurable regulator that is configured to support both linear and switching modes power management scheme.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

System-on-chips require power, which is regulated by regulators. One type of regulator is a linear regulator, which is simple, inexpensive and provides high response but is low in efficiency. Another type of regulator is a DC-to-DC switching regulator, which is more expensive but highly efficient. However, each of the chips can typically handle only one type of regulator. Moreover, each chip would require separate regulator circuits based on the system demands—i.e., a first regulator circuit for low efficiency demands and a second regulator circuit for high efficiency demands. Additionally, a few of the same components are used in both the linear and switching regulators tend to take up lot of area on the chip and use same components in their respective circuits, which is expensive and also lacks flexibility to be able to regulate the power both in the linear mode and the switching mode in a single circuit.

SUMMARY

Embodiments described herein provide a reconfigurable power regulator in accordance with a first implementation of the subject matter includes an error amplifier configured to generate a difference signal indicative of a voltage difference between a reference analog signal and a feedback analog signal, a pulse width modulation (PWM) generator configured to receive the difference signal, and generate a first pulse width modulated signal in a linear mode and a second pulse width modulated signal in a switching mode, a digital multiplexer (MUX) configured to receive a mode selection signal, receive the first pulse width modulated signal and receive the second pulse width modulated signal. The digital MUX outputs one of the first pulse width modulated signal or the second pulse width modulated signal based on the mode selection signal. The reconfigurable power regulator also includes a digital driver configured to receive one of the first pulse width modulated signal or the second pulse width modulated signal and outputs a digital control signal based on the received first pulse width modulated signal or the second pulse width modulated signal.

In a first variant of the reconfigurable regulator according to the first implementation, the mode selection signal is pre-determined based on a pre-defined system configuration.

In a second variant of the reconfigurable regulator according to the first implementation, the mode selection signal is either a linear mode selection signal or a switching mode selection signal.

In a third variant of the reconfigurable regulator according to the first implementation, the digital driver operates as a switch such that upon receipt of the first pulse width modulated signal in the linear mode, the digital driver outputs a first digital control signal to digitally control a power transistor in the linear mode and upon receipt of the second pulse width modulated signal in the switching mode, the digital driver outputs a second digital control signal to digitally control the power transistor in the switching mode.

In a fourth variant of the reconfigurable regulator according to the first implementation, upon receipt of the linear mode selection signal, the digital multiplexer is configured to selectively govern the width of the pulses in the first pulse width modulated signal to control a state of the power transistor causing one of decrease, increase or maintain without change in an output voltage.

In a fifth variant of the reconfigurable regulator according to the first implementation, in response to receiving the difference signal, the PWM generator is configured to cause one of decrease in an amount of current flowing into the power transistor, increase in the amount of current flowing into the power transistor, or maintain the amount of current flowing into the power transistor.

In a sixth variant of the reconfigurable regulator according to the first implementation, the digital driver is configured to regulate the output voltage at a frequency of approximately 250 MHz in the linear mode.

In a seventh variant of the reconfigurable regulator according to the first implementation, upon receipt of the switching mode selection signal, the digital multiplexer is configured to selectively govern the width of the pulses in the second pulse width modulated signal to control a state of the power transistor causing an increase or decrease in an output voltage.

In an eighth variant of the reconfigurable regulator according to the first implementation, in response to receiving the difference signal, the PWM generator is configured to cause one of decrease in an amount of current flowing into the power transistor or increase in the amount of current flowing into the power transistor.

In a ninth variant of the reconfigurable regulator according to the first implementation, wherein the digital driver is configured to regulate the output voltage at a frequency of approximately 3 MHz in the switching mode.

A method for controlling power to a power transistor in accordance with a second implementation of the subject matter of this disclosure, includes generating by an error amplifier a difference signal indicative of a voltage difference between a reference analog signal and a feedback analog signal, receiving by a pulse width modulation (PWM) generator the difference signal and upon receipt of the difference signal, generating a first pulse width modulated signal in a linear mode and a second pulse width modulated signal in a switching mode, receiving by a digital multiplexer (MUX) a mode selection signal, the first pulse width modulated signal and the second pulse width modulated signal and upon receipt of the first pulse width modulated signal and the second pulse width modulated signal, outputting by the digital MUX one of the first pulse width modulated signal or the second pulse width modulated signal based on the mode selection signal, receiving by a digital driver one of the first pulse width modulated signal or the second pulse width modulated signal outputted by the digital MUX; and outputting by the digital driver a digital control signal based on the received one of the first pulse width modulated signal or the second pulse width modulated signal.

BRIEF DESCRIPTION OF THE DRAWINGS

Further features of the disclosure, its nature and various potential advantages will become apparent upon consideration of the following detailed description, taken in conjunction with the accompanying drawings, in which like reference characters refer to like parts throughout, and in which.

DETAILED DESCRIPTION

Figure 1:
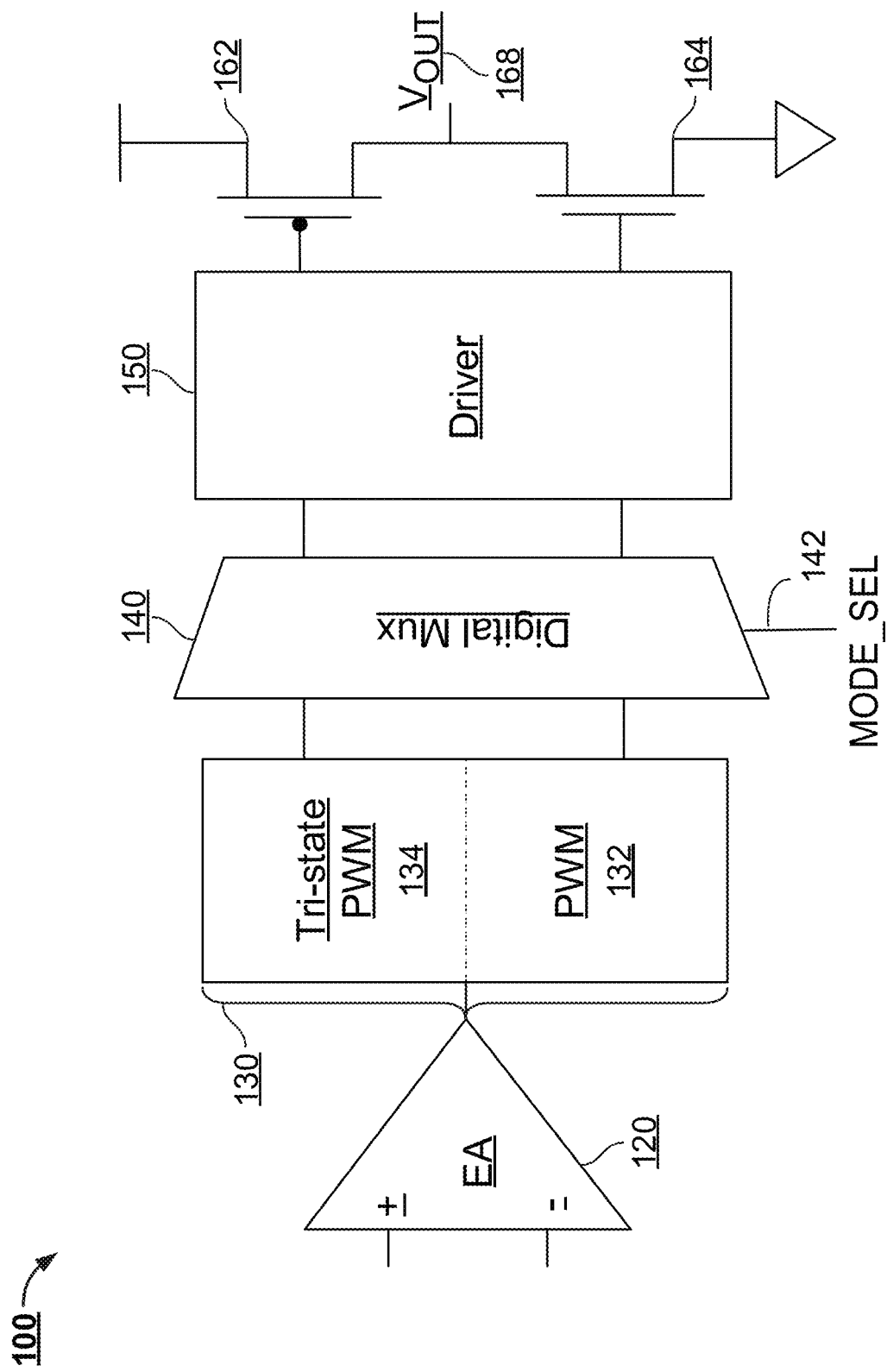
FIG. 1 is a block diagram of a reconfigurable regulator, in accordance with an embodiment of the present disclosure.

In accordance with implementations of the present disclosure, methods and systems for regulating power of a transistor on a chip is disclosed. Specifically, disclosed is a reconfigurable regulator, which combines both the linear regulator and the switching regulator in one circuit designed onto a single chip. The reconfigurable regulator includes components which are utilized when operating in linear mode and also when operating in switching mode. In one aspect, such a reconfigurable regulator is not only low in cost but also provides flexibility to function both in switching mode for high-efficiency and linear mode for low cost and fast response. Additionally, the reconfigurable regulator of the present disclosure functions as a mode selecting regulator such that the regulator provides for a solution/means for selecting one of the linear mode or the switching mode for the reconfigurable regulator based on system demands. Furthermore, in one implementation, the reconfigurable regulator utilizes a digital multiplexer that functions to digitally regulate power both in the switching and the linear g modes.

Conventionally, each of the switching regulator circuit and the linear regulator circuits include some components that perform the same functions in the respective regulator circuits. If the system design configuration requires a low-cost faster response, a linear regulator circuit is built in a chip. The linear regulator circuit typically includes an error amplifier and a driver which functions to control power to the transistor in the linear mode. If, on the other hand, the system design configuration requires a highly efficient response, conventional systems provide a separate switching regulator circuit in a second chip. The switching regulator typically includes a separate error amplifier, a pulse-width modulation generator and a separate driver, which functions to control power to the transistor in the switching mode. In this manner many of the components such as the error amplifier, the driver, and the transistor are duplicated in their respective modes (i.e., linear and switching modes). Thus, such conventional systems are highly inefficient, expensive and lack the flexibility to be able to regulate the power both in the linear mode and the switching mode.

Accordingly, a reconfigurable regulator is disclosed having components that, in one embodiment consistent with the disclosure here, are used when operating in either the switching mode and the linear mode. Moreover, the reconfigurable regulator operates as a mode selecting regulator configured to function in either the linear mode or the switching mode. Specifically, the reconfigurable regulator includes (in one implementation) a single digital multiplexer, which is utilized as switch or a mode selector that functions to select a linear or a switching mode based on the system design requirements. Thus, this reduces the area on the chip required to be designated for the power regulator thereby increasing cost effectiveness and providing the flexibility of digitally regulating the power not only in switching mode but also in the linear mode.

FIG. 1 is a block diagram illustrating a reconfigurable regulator 100, according to some embodiments described herein. The reconfigurable regulator 100 includes an error amplifier 120, a pulse width modulation (PWM) generator 130, a digital multiplexer 140, a digital driver 150 and a set of power transistors, PMOS transistor 162 and a NMOS transistor 164.

In one embodiment shown in FIG. 1, the error amplifier 120 receives a reference analog voltage signal and a feedback analog voltage signal at its inputs, and outputs a difference voltage analog signal indicating a voltage difference signal between the analog voltage reference signal and the analog voltage feedback signal. The PWM generator 130 receives the difference signal and generates PWM signals that have pulse widths derived from the amplitude of the difference signal. The widths of the pulses within the PWM signals function are provided to control the state of both the PMOS transistor 162 and the NMOS transistor 164. The PWM generator functions as a regular PWM 132 in a switching mode and functions as a tri-state PWM 134 in a linear mode as described herein below.

Figure 2:
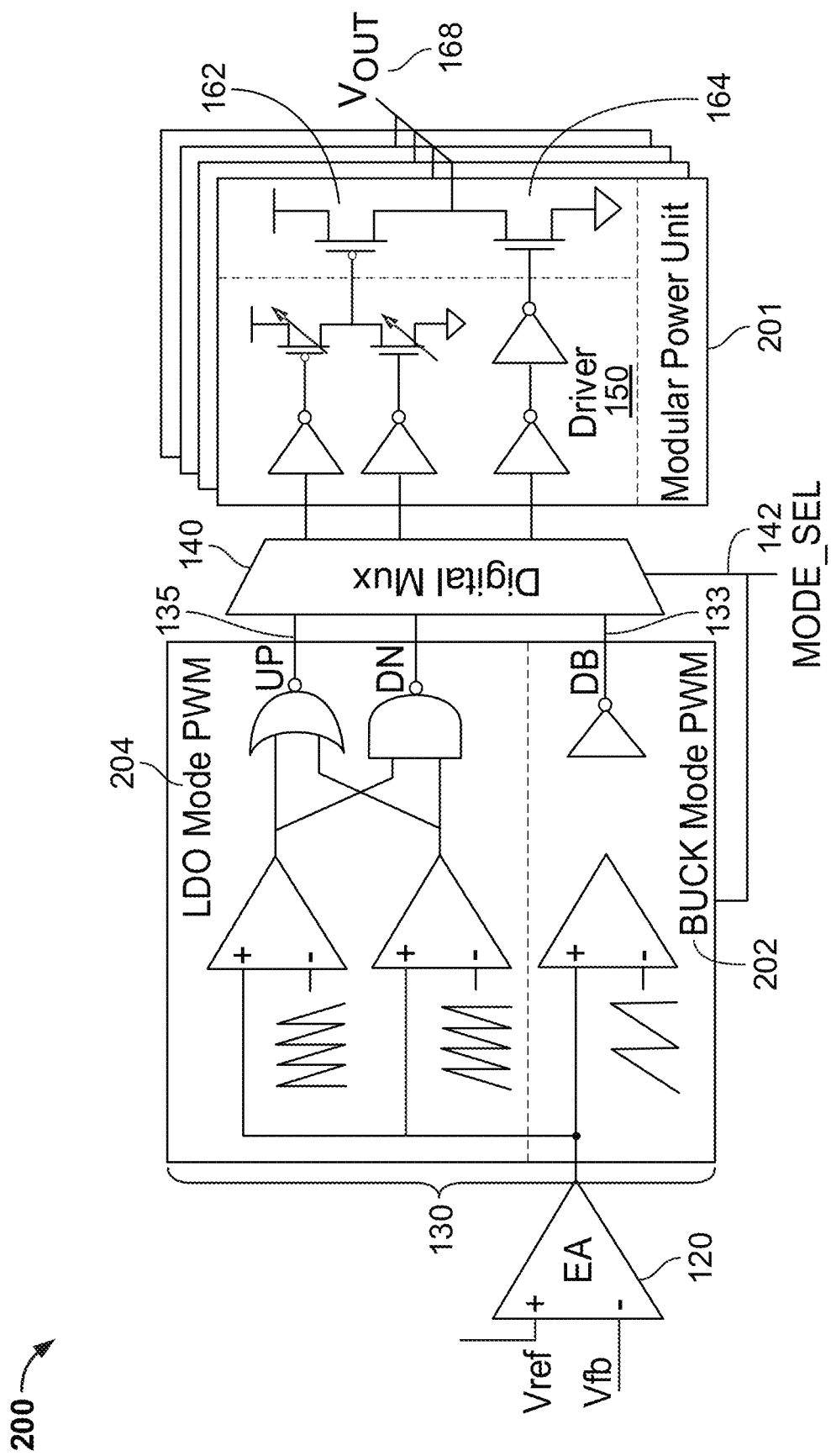
FIG. 2 is a detailed circuit diagram of the reconfigurable regulator, in accordance with an embodiment of the present disclosure.

In one embodiment, in the switching mode, the PWM generator 130 functions for example, in a buck mode (See FIG. 2. In the switching mode, the PWM 132 generates a first PWM signal 133 such that the widths of the pulses within the first PWM signal 133 functions to control state of the NMOS/PMOS power transistor 164 and allow more or less current to pass through the NMOS/PMOS transistor 164, thereby causing an output voltage, Vout 168 to decrease (ground) or increase (Vdd) respectively. In one embodiment, the reconfigurable regulator operates at frequency of 1 MHz to 5 MHz in a switching mode. In one example, in the switching mode, the PWM generator 130 regulates the output voltage at a frequency of approximately 3 MHz.

In another embodiment, in the linear mode, the PWM generator 130 functions as the tri-state PWM 134, for example, in a low-drop-out (LDO) mode (see FIG. 2). In the linear mode, the PWM generator 130 generates a second PWM signal 135 such that the widths of the pulses within the second PWM signal 135 function to control state of the PMOS power transistor 162, and allow more current, less current, or the same amount of current to pass through the PMOS transistor 162, thereby causing the output voltage Vout 168 to decrease (ground), increase (Vdd), or remain maintained without any change. In one embodiment, operation frequency of the reconfigurable regulator in a linear mode is high in order to reduce steady-state voltage ripple. In one example, in the linear mode, the PWM generator 130 regulates the output voltage at a frequency of approximately 250 MHz.

In one embodiment, the digital multiplexer (MUX) 140, receives the first PWM signal 133 and the second PWM signal 135. The digital MUX 140 also receives a mode selection signal 142 at a pre-determined time. The mode selection signal is either a linear mode selection signal or a switching mode selection signal, which is pre-determined based on system configuration. The digital MUX 140 selects either the first PWM signal 133 or the second PWM signal 135 based on the mode selection signal 142 and based on this selection, the digital MUX 140 accordingly outputs either the first PWM signal 133 or the second PWM signal 133.

In one embodiment, the digital driver 150 receives either the first PWM signal 133 or the second PWM signal 135. The digital driver 150 operates as a switch such that when the driver 150 receives the first PWM signal 133, the driver 150 outputs a first control signal to control state of the NMOS transistor 164 and the PMOS transistor 162, and when the driver 150 receives the second PW signals 135, the driver 150 outputs a second control signal to control the state of the PMOS transistor 162.

FIG. 2 is a detailed circuit diagram of the reconfigurable regulator 200, according to some embodiments described herein. The reconfigurable regulator 200 is similar to the reconfigurable regulator 100 including the error amplifier 120, the pulse width modulation (PWM) generator 130, and the digital MUX 140. In addition, FIG. 2 illustrates multiple modular power units 201 each of which include the digital driver 150 and the power transistors PMOS and NMOS transistors 162 and 164 respectively. As discussed above, the PWM 130 functions as a regular PWM 132 in the switching mode and the tri-state PWM 134 in the linear mode.

As illustrated in FIG. 2, the PWM 132 functions as a buck mode PWM 202 in the switching mode. A buck mode PWM is well known in the art, which functions to step down voltage (while stepping up current) from its input (supply) to its output (load). In one embodiment, in the buck mode PWM 202, when the PWM 132 receives the difference signal, the PWM generator functions to lower an input voltage to the error amplifier 120 to output the second pulse width signal 135 with an output voltage, Vout 168 to be lower than the input voltage to the error amplifier 120. Although, the buck mode PWM 202 in FIG. 2 is illustrated to include as an example, an amplifier and an inverter, other types of circuits can be utilized for a buck mode PWM configuration. The difference signal is received by the buck mode PWM 202 and outputted as the first PWM signal 133 to the digital MUX 140. When, the digital MUX 140 receives the mode selection signal 142 as the switching mode selection signal, the digital MUX 140 outputs the first PW signal 133 to the digital driver 150. Although, in the switching mode, the digital driver 150 in FIG. 2 is illustrated to include two inverters, other types of circuits can be utilized for a digital MUX configuration.

As discussed above, the digital driver 150 operates as a switch. When the driver 150 receives the first PWM signal 133, the driver 150 outputs a first control signal to control state of the NMOS transistor 164 and the PMOS transistor 162. In one example, when the output of the digital driver 150 is 1, then less current passes through the transistor 162 causing increase in the output voltage, Vout, for example, Vdd. In another example, when the output of the digital driver 150 is 0, then more current passes through the transistor 162, causing decrease in the output voltage Vout to go to ground.

As discussed above, the PWM 132 functions as a tri-state PWM 134 in linear mode. An example of the tri-state PWM 134 is an LDO mode PWM 204 as illustrated in FIG. 2. The LDO mode PWM 204 generates three PWM signals as the second PWM signal 135 based on the difference signal from the error amplifier 350. The first PWM signal is an "UP" signal, and the second PWM signal is a "DN" signal. Both the "UP" and the "DOWN" signals function to control gates of a PMOS transistor and an NMOS transistor in the digital driver 150 respectively. Additional information of the LDO mode PWM 204 and the circuits in the configuration of the LDO mode and the driver 150 are described in commonly assigned U.S. Pat. No. 10,126,769, details of which are incorporated herein by reference.

In one embodiment, when, the digital MUX 140 receives the mode selection signal 142 as the linear mode selection signal, the digital MUX 140 outputs the "UP" and "DOWN" signals to the digital driver 150. The "UP" signal is provided to lower the gate voltage of the PMOS transistor in the digital driver 150, which allows for more current to pass through the PMOS transistor 162 resulting in an increase in the Vout 168. The "DOWN" signal is provided to increase the gate of the NMOS transistor in the digital driver 150, which allows less current to pass through the PMOS transistor 162 resulting in a decrease in the Vout 168. In one embodiment, when the difference between the analog voltage reference signal and the analog voltage feedback signal is 0, then same amount of current passes through the PMOS transistor 162 causing the Vout 168 to remain unchanged. Additional information of signals and the circuitry of the digital driver 150 are described in commonly assigned U.S. Pat. No. 10,126,769, details of which are incorporated herein by reference.

Figure 3:
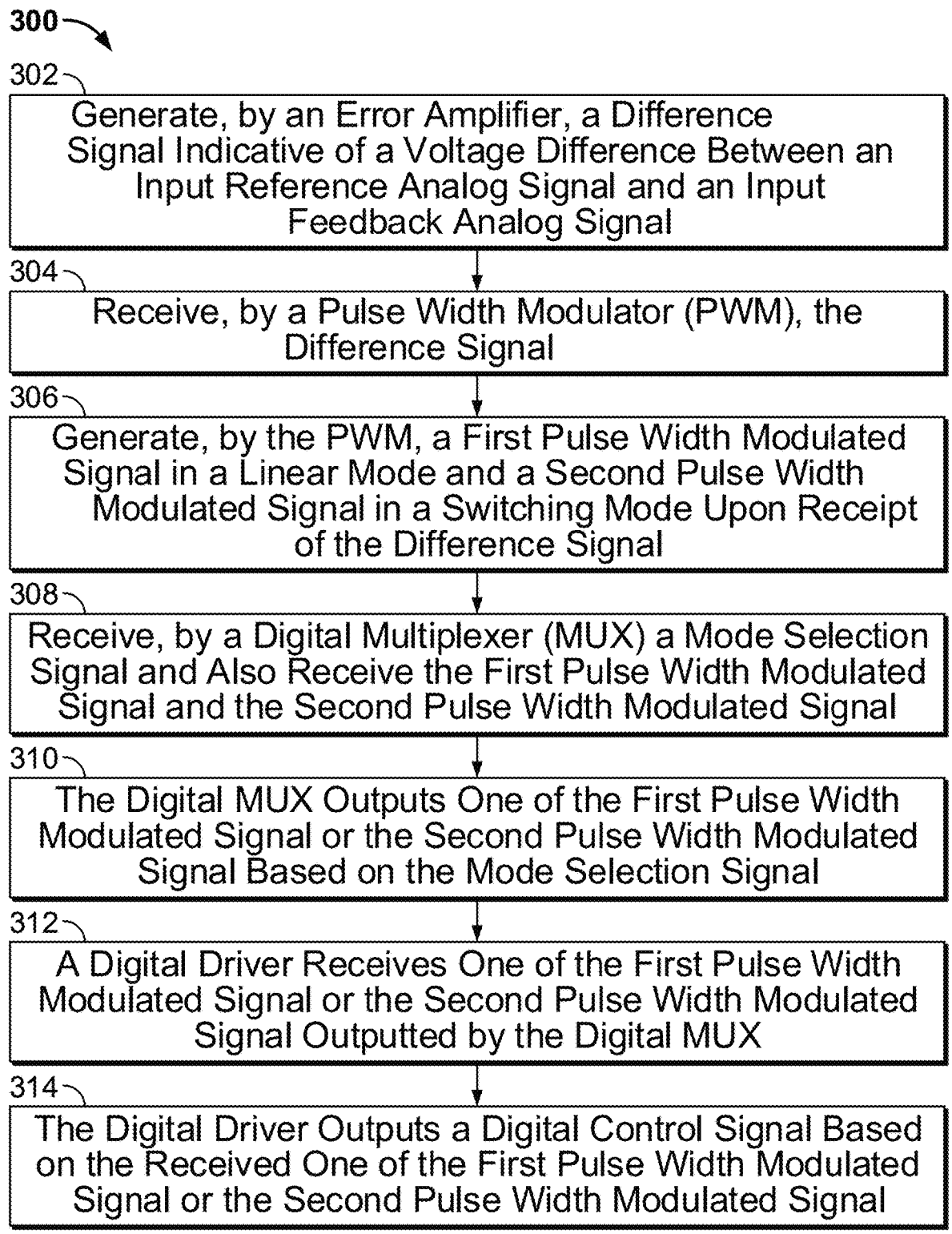
FIG. 3 is a high-level flow chart for a process for using the reconfigurable regulator to regulate the power, in accordance with an embodiment of the present disclosure.

FIG. 3 provides an example logic flow diagram of a method 300 illustrating aspects of using the reconfigurable regulator to regulate power, according to some embodiments described herein. The work flow method 400 shown in FIG. 3 is performed by the reconfigurable regulator 100 illustrated in FIGS. 1 and 2.

The method 300 begins at 302, an error amplifier generates a difference signal indicative of a voltage difference between an input reference analog signal and an input feedback analog signal. At 304, a pulse width modulation (PWM) generator receives the difference signal. At 306, the PWM generator generates a first pulse width modulated signal in a linear mode and a second pulse width modulated signal in a switching mode upon receipt of the difference signal. At 308, a digital multiplexer (MUX) receives a mode selection signal and receives the first pulse width modulated signal and the second pulse width modulated signal. In one embodiment, the mode selection signal includes a linear mode selection signal or a switching mode selection signal. At 310, the digital MUX outputs one of the first pulse width modulated signal or the second pulse width modulated signal based on the mode selection signal. In one embodiment, the digital MUX selects to output either the first pulse width modulated signal, or the second pulse width modulated signal based on the received mode selection signal. In one embodiment, the digital MUX receives the linear mode selection signal and selects the first pulse width modulated signal in the linear mode. In another embodiment, the digital MUX receives the switching mode selection signal and selects the second width modulated signal in the switching mode.

In one embodiment, at 312, a digital driver receives one of the first pulse width modulated signal or the second pulse width modulated signal outputted by the digital MUX. The digital driver at 314 outputs a digital control signal based on the received one of the first pulse width signal or the second pulse width signal. In one embodiment, the digital driver outputs a first digital control signal to digitally control a power transistor in the linear mode. In another embodiment, the digital driver outputs a second digital control signal to digitally control the power transistor in the switching mode.

Various embodiments discussed in conjunction with FIGS. 1-3 are performed by various electronic components of one or more electronic circuits, such as but not limited to an integrated circuit, application-specific integrated circuit (ASIC), DSP, and/or the like. Various components discussed throughout this disclosure such as, but not limited to circuit devices as shown in FIG. 1 and FIG. 2, and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A reconfigurable power regulator integrated in a chip, the reconfigurable power regulator comprising:
    an error amplifier configured to generate a difference signal indicative of a voltage difference between (i) a reference analog signal and (ii) a feedback analog signal;
    a pulse width modulation (PWM) generator configured to receive the difference signal, and
        to generate (i) a first pulse width modulated signal in a linear mode and (ii) a second pulse width modulated signal in a switching mode;
    a digital multiplexer (MUX) configured to receive a mode selection signal, receive the first pulse width modulated signal and receive the second pulse width modulated signal, wherein the digital MUX outputs one of the first pulse width modulated signal or the second pulse width modulated signal based on the mode selection signal; and
    a digital driver configured to
        receive one of the first pulse width modulated signal or the second pulse width modulated signal, and
        output a digital control signal based on the received one of the first pulse width modulated signal or the second pulse width modulated signal.

2. The reconfigurable power regulator claimed in claim 1, wherein the mode selection signal is pre-determined based on a pre-defined system configuration.

3. The reconfigurable power regulator claimed in claim 1, wherein the mode selection signal is one of a linear mode selection signal or a switching mode selection signal.

4. The reconfigurable power regulator claimed in claim 3, wherein the digital driver to operate as a switch such that upon receipt of the first pulse width modulated signal in the linear mode, the digital driver to output a first digital control signal to digitally control a power transistor in the linear mode and upon receipt of the second pulse width modulated signal in the switching mode, the digital driver to output a second digital control signal to digitally control the power transistor in the switching mode.

5. The reconfigurable power regulator claimed in claim 4, wherein upon receipt of the linear mode selection signal, the digital multiplexer is configured to selectively govern the width of the pulses in the first pulse width modulated signal to control a state of the power transistor causing one of decrease, increase or maintain without change in an output voltage.

6. The reconfigurable power regulator claimed in claim 5, wherein the PWM generator is configured to, in response to receiving the difference signal, cause one of decrease in an amount of current flowing into the power transistor, increase in the amount of current flowing into the power transistor, or maintain the amount of current flowing into the power transistor.

7. The reconfigurable power regulator claimed in claim 5, wherein the digital driver is configured to regulate the output voltage at a frequency of approximately 250 MHz in the linear mode.

8. The reconfigurable power regulator claimed in claim 3, wherein upon receipt of the switching mode selection signal, the digital multiplexer is configured to selectively govern the width of the pulses in the second pulse width modulated signal to control a state of the power transistor causing an increase or decrease in an output voltage.

9. The reconfigurable power regulator claimed in claim 8, wherein the PWM generator is configured to, in response to receiving the difference signal, to cause one of decrease in an amount of current flowing into the power transistor or increase in the amount of current flowing into the power transistor.

10. The reconfigurable power regulator claimed in claim 8, wherein the digital driver is configured to regulate the output voltage at a frequency of approximately 3 MHz in the switching mode.

11. A method for controlling power to a power transistor, the method comprising:
    generating, by an error amplifier, a difference signal indicative of a voltage difference between (i) a reference analog signal and (ii) a feedback analog signal;
    receiving, by a pulse width modulation (PWM) generator, the difference signal;
    upon receipt of the difference signal, generating, by the PWM generator, a first pulse width modulated signal in a linear mode and a second pulse width modulated signal in a switching mode;

receiving, by a digital multiplexer (MUX), a mode selection signal;

receiving, by the digital MUX, the first pulse width modulated signal and the second pulse width modulated signal;

upon receipt of the first pulse width modulated signal and the second pulse width modulated signal, outputting, by the digital MUX one of the first pulse width modulated signal or the second pulse width modulated signal based on the mode selection signal;

receiving, by a digital driver, one of the first pulse width modulated signal or the second pulse width modulated signal outputted by the digital MUX; and outputting, by the digital driver, a digital control signal based on the received one of the first pulse width modulated signal or the second pulse width modulated signal.

12. The method as claimed in claim 11, wherein the mode selection signal is pre-determined based on a pre-defined system configuration.

13. The method as claimed in claim 11, wherein the mode selection signal is one of a linear mode selection signal or a switching mode selection signal.

14. The method as claimed in claim 13, wherein the digital driver to operate as a switch such that upon receipt of the first pulse width modulated signal in the linear mode, outputting, by the digital driver, a first digital control signal to digitally control the power transistor in the linear mode and upon receipt of the second pulse width modulated signal in the switching mode, outputting by the digital driver, a second digital control signal to digitally control the power transistor in the switching mode.

15. The method as claimed in claim 14, wherein upon receipt of the linear mode selection signal, selectively governing, by the digital MUX, the width of the pulses in the first pulse width modulated signal to control a state of the power transistor causing one of decrease, increase or maintain without change in an output voltage.

16. The method as claimed in claim 15, further comprising:

in response to receiving the difference signal, causing, by the PWM generator, to one of decrease in an amount of current flowing into the power transistor, increase in the amount of current flowing into the power transistor, or maintaining the amount of current flowing into the power transistor.

17. The method as claimed in claim 16, wherein the output voltage is regulated at a frequency of approximately 250 MHz in the linear mode.

18. The method as claimed in claim 13, wherein upon receipt of the switching mode selection signal, selectively governing by the digital multiplexer, the width of the pulses in the second pulse width modulated signal to control a state of the power transistor causing an increase or decrease in an output voltage.

19. The method as claimed in claim 18, further comprising:

upon receipt of the difference signal, causing, by the PWM generator, to one of decrease in an amount of current flowing into the power transistor, or increase in the amount of current flowing into the power transistor.

20. The method as claimed in claim 19, wherein the output the output voltage is regulated at a frequency of approximately 3 MHz in the switching mode.

* * * * *